No. 712,390. Patented Oct. 28, 1902.
I. P. B. KNUDSEN.
CREAM SEPARATOR.
(Application filed Apr. 29, 1902.)

(No Model.)

Witnesses
Grace P. Brereton
Albert Popkins

Inventor
I. P. B. Knudsen
By Shurtwrad Freeley
Attorneys

UNITED STATES PATENT OFFICE.

IVAR PETER BAGGER KNUDSEN, OF COPENHAGEN, DENMARK.

CREAM-SEPARATOR.

SPECIFICATION forming part of Letters Patent No. 712,390, dated October 28, 1902.

Application filed April 29, 1902. Serial No. 105,129. (No model.)

*To all whom it may concern:*

Be it known that I, IVAR PETER BAGGER KNUDSEN, graduate of the Polytechnic, of Kristiansgade 2, Copenhagen, Denmark, have invented a new and useful Improvement in Cream-Separators, of which the following is a specification.

This invention relates to centrifugal cream-separators in which the introduction of the milk is effected from the center of the centrifugal, and has for objects to render the distribution of the milk, in a vertical sense, uniform and to prevent the unskimmed milk introduced from mixing with the cream that is separated out and is directed inward toward the center, and thereby considerably to increase the working capacity of the centrifugal.

Figure 1:
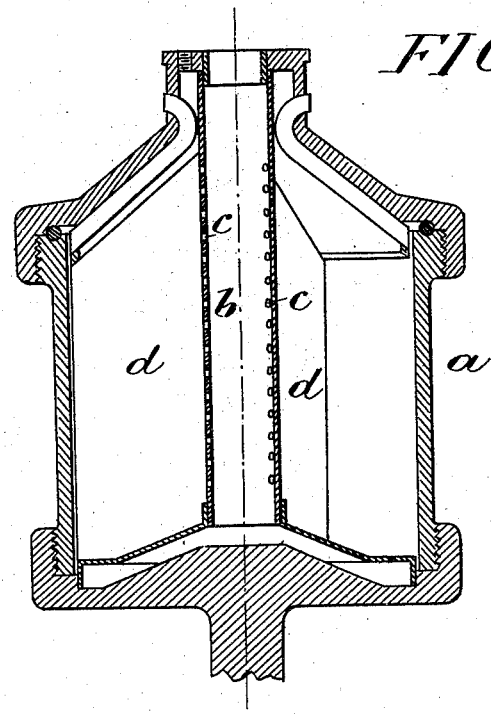
Figure 2:
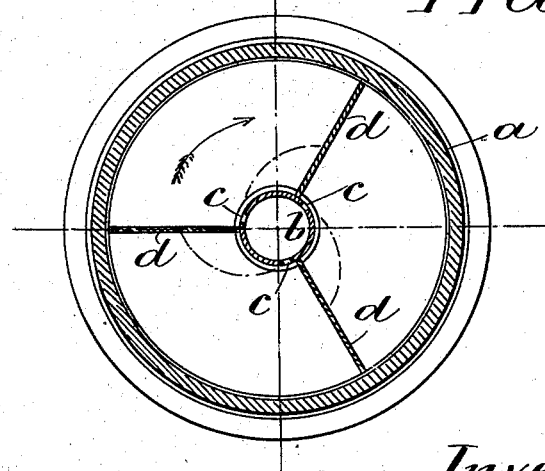

Figure 1 of the accompanying drawings is a vertical section of centrifugal apparatus according to this invention, and Fig. 2 is a horizontal section thereof.

The unskimmed milk is introduced into a centrifugal drum $a$ through a pipe $b$, which is concentric with the drum and in which there are provided parallel to its axis rows of holes $c$, through which the unskimmed milk runs into the drum and by means of which its distribution, in a vertical sense, is uniform. Each row of holes $c$ has behind it in relation to the rotation of the centrifugal a radial or almost radial dividing plate or wing $d$. The unskimmed milk introduced runs outward in a thin sheet along the front surface of each of the plates $d$, because the milk flowing from the interior moves to places which have a continually-increasing rotating velocity, and it consequently has a tendency at the same time as it moves outward through the rotating movement of the drum to be pressed against the front side of the dividing plate or wing $d$. At the same time the particles of cream or fat, which are separated at the periphery of the centrifugal and which besides traveling inward also attempt to make a movement forward in the direction of the rotation, impinge or bear against the rear surface of the dividing-plate and follow it inward toward the center and take up chiefly the position indicated between the center, the dividing-plate, and the dotted lines in Fig. 2. By the means described the mixing of the unskimmed milk with the cream separated threfrom is prevented in a very high degree and the working capacity of the centrifugal is consequently greatly augmented.

The device described can of course be used also for centrifugals with liners of a known type. Where such liners divide the centrifugal into chambers placed one above another, then, of course, dividing-plates $d$ or the like are provided in each one of these chambers.

Having thus described my invention, what I claim is—

A separator, comprising the centrifugal drum, the central vertical pipe therein, and a series of vertical substantially radial plates extending from the said tube, the said pipe having a series of rows of apertures extending in a direction parallel with its axis, a row of said apertures being placed adjacent to the forward face of every one of said plates; substantially as described.

In witness whereof I have hereunto set my hand in presence of two witnesses.

IVAR PETER BAGGER KNUDSEN.

Witnesses:
J. C. JACOBSEN,
MAGNUS JENSEN.